June 16, 1959        H. LUKOFF        2,891,242
LIGHT INDICATOR FOR ELECTRICAL SIGNALS
Filed Nov. 29, 1955
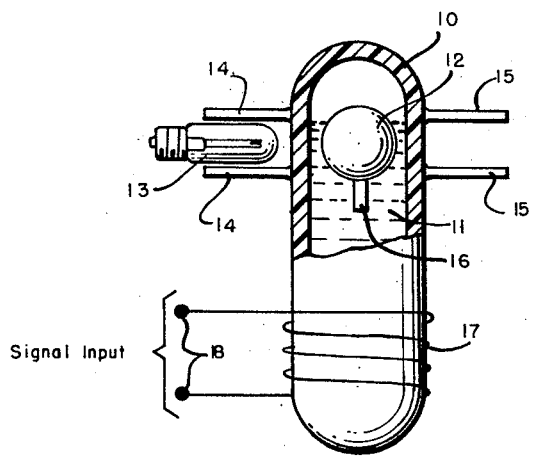
INVENTOR.
HERMAN LUKOFF
BY
AGENT 2,891,242

LIGHT INDICATOR FOR ELECTRICAL SIGNALS

Herman Lukoff, Philadelphia, Pa., assignor to Sperry Rand Corporation, New York, N.Y., a corporation of Delaware Application November 29, 1955, Serial No. 549,607

13 Claims. (Cl. 340—366)

The present invention relates to improved indicating devices which are adapted to permit observation of output state in various electronic circuits, and is more particularly concerned with an indicating device which requires very low power levels to effect operation thereof whereby the said device may be utilized as an indicator in circuits such as those utilizing transistors or magnetic amplifiers.

It is often required that a visual indication be given as to whether a low power circuit is actually consuming power and producing an output or remaining in the "off" state. Visual indicators known heretofore, such as those utilizing neon bulbs or incandescent lamps, for the most part require relatively high power levels for proper operation thereof. Other forms of indicators, such as meters, have been suggested when low power level output indicators are desired, but these latter structures are relatively fragile in operation, are costly to provide, and have moving parts which are subject to wear. The present invention serves to obviate the foregoing disadvantages and provides an improved indicator, capable of utilization in low power level circuits, which provides a bright visual output and which is inexpensive to construct and provide, while at the same time having an extremely long life.

It is accordingly an object of the present invention to provide an improved visual indicator.

A further object of the present invention resides in the provision of an indicator giving a bright visual output and capable of indicating extremely low power levels, for instance less than one milliwatt.

Another object of the present invention resides in the provision of a novel magnetic amplifier device wherein a relatively low signal level may control a relatively large source of radiant energy.

Still another object of the present invention resides in a visual indicator which is rugged in configuration, which can be made in extremely small sizes and which is less expensive than other indicators known heretofore.

In providing for the foregoing objects, the present invention contemplates an indicator comprising a container having a fluid, preferably a liquid therein. A body, for instance a ball, is adapted to float or otherwise be suspended in the fluid in the normal radiation path of a light source mounted adjacent the container. Under normal operation conditions, therefore, the position of the ball or other body in the fluid blocks radiant energy from the light source whereby no visual output is achieved. The said body further includes a portion of a magnetic material and this magnetic portion is adapted to cooperate with a signal coil included in the indicator and displaced from the normal position of the body. By this structure, therefore, the application of a signal input to the aforementioned coil causes the magnetic material, and therefore the body, to be drawn toward the coil by a solenoid action whereby the light source is exposed to view thereby to give the desired visual output.

The foregoing objects, advantages, construction and operation of the present invention will become more readily apparent from the following description and from the accompanying drawing which is representative of a preferred embodiment of the present invention.

Referring now to the drawing, it will be seen that an indicator in accordance with the present invention may comprise a closed vial or container 10 formed of a transparent material, such as glass, and the said container 10 is in the preferred embodiment partially filled with a dense transparent liquid 11 of low viscosity. A much less dense ball or other floating body 12 is placed within the vial or container 10, and the specific gravity of the liquid is so chosen that the body 12 just barely floats adjacent the surface of liquid 11. A light source 13, indicated as a lamp, is disposed external to the container 10 adjacent the normal floating position of the body 12 and the light from the said source 13 is confined by shields or masks 14 adjacent one side of container 10 and by further shields or masks 15 adjacent the other side of the container 10. In its normal or quiescent position, as indicated in the figure, therefore, the floating body 12 blocks radiant energy from the light source 13 whereby no visual output will appear through the walls of container 10 within the confines of mask 15.

The floating body 12 further includes a magnetic element which is illustratively shown in the figure as a metallic projection 16 depending from the body 12 beneath the surface of liquid 11. A control coil 17 is also wound about the container 10 and is adapted to produce an attracting flux upon the application of a controlling signal input at terminals 18. In operation, therefore, when a signal input does appear at terminals 18, the element 16 and therefore the ball 12, is drawn downward toward the coil 17 by a solenoid action whereby light from the source 13 may pass through the transparent walls of container 10 and thence through the transparent liquid 11 so that it may be observed in the area defined by masks or shields 15. Upon removal of the signal input at terminal 18, the body 12 will be returned by flotation to a position adjacent the surface of liquid 11 thereby to once more block radiant energy from source 13. Thus, the device shown in the figure and described above is adapted to respond to an input signal at terminal 18 for giving a visual output in the area of mask 15, and the absence of such a signal input serves to block the radiant energy whereby no visual output is effected.

It will be appreciated from the foregoing discussion that the ball or floating body 12 need not be drawn completely downward to expose the entire area defined by mask or shields 15 before a visual output is achieved and in fact a partial downward movement by the ball 12 will serve to expose some light thereby to give a desired output. This consideration permits a considerable variation in the possible sensitivity of the device by appropriate changes in the position of the light source 13 or the shields 14 and 15 with respect to the surface of liquid 12, and by appropriately selecting the position of the light source 13 with respect to the normal floating position of body 12. A predetermined signal threshold may thus be automatically effected before a bright visual output is actually achieved. Also, while the described invention has employed an opaque body floating at the surface of a fluid, the body can in fact normally be below the fluid surface whereby it may be drawn selectively upward or downward from its quiescent position. This latter embodiment of the invention is particularly valuable when the suspending fluid comprises a gas rather than a liquid.

In addition, it should be noted that while the body 12 has been described as spherical, other forms of selective light-blocking structures may be employed including rectangular or oblong members, and by the same token the magnetic element 16 may be replaced by other forms of magnetic structure permitting the desired selective attraction of the ball 12 within the container 10. It should further be noted that while the closed container 10 has been illustrated and described as a glass, or otherwise uniformly transparent or translucent vial, the container can in fact comprise an opaque material and can define transparent or translucent windows or transparent or translucent bands adjacent the surface of liquid 11 in the vicinity of masks or shields 14 or 15.

Still further variations will be suggested to those skilled in the art. For instance, the invention, as described above, has specified that the liquid 11 is transparent in nature and this consideration follows from the operation of the device, in that light energy from source 13 must actually pass through the liquid 11 under selected conditions of operation. In actual practice, the depression or submerging of body 12 tends to cause the surface of the liquid 11 to rise somewhat into the unfilled space defined adjacent the top of closed container or vial 10, and the amount of this liquid rise is dependent upon the quiescent flotation position of the body 12 on the surface of the liquid. If the body 12 should normally float "high" on the surface of the liquid, the submerging of that body causes a greater rise in the liquid surface than is the case in the particular embodiment illustrated, wherein the body floats "low" in the liquid. This latter consideration permits a modified indicator to be constructed wherein the passage of the radiant energy from a light source such as 13 is dependent upon the level of the liquid surface within the container, and in this form of the invention the liquid 11 may comprise an opaque fluid. Thus, the light source could be mounted above the normal or quiescent surface level of liquid 11, in which event light would normally be transmitted to a visual output area. Depression of a floating body such as 12 could then be utilized to cause the surface of the liquid to rise, and if that liquid is opaque the light flux would thereby be blocked.

Other variations will be suggested to those skilled in the art, and it must therefore be stressed that the foregoing description is meant to be illustrative only and should not be considered to be limitative of my invention. All such modifications as are in accordance with the principles described are meant to fall within the scope of the appended claims.

Having thus described my invention, I claim:

1. In an electronic circuit, a signal indicating device comprising a container, the walls of said container being formed of a translucent material, a confined light source adjacent and external to said container, a predetermined constant volume of translucent liquid enclosed in said container, the normal surface level of said liquid being adjacent said light source, an opaque body suspended in said liquid adjacent the path of radiant energy from said light source so that said body normally blocks light from said light source, a source of electrical signals, means responsive to signals from said signal source for selectively changing the position of said body in said liquid thereby selectively to expose radiant energy from said light source, said opaque body including a metallic portion of magnetic material, said signal responsive means comprising a wire coil coupled to said signal source and disposed adjacent said container below the normal surface level of said liquid whereby current flow through said coil draws said opaque body toward said coil by solenoid action.

2. A signal indicator comprising a container having a translucent section, a predetermined constant volume of liquid in said container, an opaque body floating on the surface of said liquid in said container adjacent said translucent section, said body including a portion of magnetic material, a coil disposed adjacent said container below the normal surface level of said liquid, means for selectively passing current through said coil whereby said body is selectively drawn toward said coil by solenoid action, and a light source adjacent said translucent section of said container, whereby radiant energy from said light source is selectively exposed and blocked, as viewed through said translucent section, in dependence upon the position of said body with respect to the surface of said liquid.

3. The indicator of claim 2 wherein said liquid is translucent, said body being normally disposed in the path of radiant energy from said light source, whereby current flow in said coil submerges said opaque body in said translucent liquid thereby to expose said light source.

4. The indicator of claim 3 including shielding means adjacent said container and said light source for confining radiant energy from said light source to a limited area.

5. A signal indicator comprising a closed container partially filled with a predetermined volume of transparent liquid, an opaque body floating in said liquid adjacent the surface thereof, said container being transparent adjacent the floating position of said body, a light source on the exterior of said container adjacent the floating position of said body so that radiant energy from said light source as viewed through said container is normally blocked by said body, a source of electrical signals, and electric signal responsive means for selectively depressing said body in said liquid below the normal floating position of said body thereby to expose selectively radiant energy from said light source, said signal responsive means including a magnetic element attached to said body and a coil coupled to said electrical signal source for selectively altering the position of said body in said liquid by solenoid action.

6. The indicator of claim 5 wherein said body is spherical in configuration, said magnetic material comprising a metallic projection depending from said body below the surface of said liquid.

7. In an electronic circuit, a signal indicating device comprising a container, at least a portion of which is of translucent material, a confined light source external to and adjacent said translucent portion of said container, a fluid in said container and a body suspended in said fluid, at least one of said body and said fluid being of a material capable of blocking the flow of light, whereby the combination including the container, fluid, and the suspended body are capable of operation as a light valve, a source of signals, and means for controlling the passage of radiant energy from said light source through said container including means responsive to signals from said signal source for selectively changing the position of said suspended body in said fluid.

8. The signal indicating device of claim 7 wherein said container encloses a predetermined constant volume of liquid, said body being suspended by flotation in said liquid adjacent the surface thereof.

9. The signal indicating device of claim 8 wherein said signal responsive means includes a wire coil coupled to said signal source and disposed adjacent said container below the normal surface level of said liquid, and a metallic portion on said body formed from magnetic material whereby the selective application of a signal causes current to flow through said coil and draws said body toward said coil by solenoid action.

10. The signal indicating device of claim 7 wherein said liquid is translucent, said body is of an opaque material and the location of the light source relative to the container is such that said body normally blocks the path of radiant energy from said light source.

11. The signal indicating device of claim 8 wherein the body is suspended with the majority of its bulk above the surface of the liquid whereby the selective application of a signal depresses the body in said liquid thereby causing a substantial rise in the surface level of said liquid.

12. The signal indicating device of claim 11 wherein said liquid is opaque and the location of the light source is such that a rise in surface level is effective to block the path of radiant energy from said light source.

13. In an electronic circuit utilizing transistors, a signal indicating device comprising a container, at least a portion of which is of translucent material, a confined light source external to and adjacent said translucent portion of said container, a fluid in said container and a body suspended in said fluid, at least one of said body and said fluid being of a material capable of blocking the flow of light, whereby the combination including the container, fluid, and the suspended body are capable of operation as a light valve, a source of signals, and means for controlling the passage of radiant energy from said light source through said container including means responsive to signals from said signal source for selectively changing the position of said suspended body in said fluid, the respective specific gravities of said fluid and said body suspended therein being so proportioned that signals of the order of milliwatts suffice to alter the position of said suspended body in said fluid.

References Cited in the file of this patent

UNITED STATES PATENTS

| | | |
|---|---|---|
| 699,140 | Blake | May 6, 1902 |
| 973,913 | Butterworth et al. | Oct. 25, 1910 |
| 1,464,894 | Webb | Aug. 14, 1923 |
| 1,713,051 | Oya | May 14, 1929 |
| 1,737,126 | Reyling | Nov. 26, 1929 |
| 2,490,627 | Hofberg | Dec. 6, 1949 |

FOREIGN PATENTS

| | | |
|---|---|---|
| 600,450 | Great Britain | Apr. 8, 1948 |